Feb. 28, 1939.　　R. H. PHINNEY ET AL　　2,149,099
DISPENSING APPARATUS
Filed April 7, 1937　　7 Sheets-Sheet 1

INVENTORS
ROBERT H. PHINNEY
GEORGE DUBON
BY
ATTORNEY

Feb. 28, 1939. R. H. PHINNEY ET AL 2,149,099
DISPENSING APPARATUS
Filed April 7, 1937 7 Sheets-Sheet 4

INVENTORS
ROBERT H. PHINNEY
GEORGE DUBON
BY
ATTORNEY

Feb. 28, 1939.   R. H. PHINNEY ET AL   2,149,099
DISPENSING APPARATUS
Filed April 7, 1937   7 Sheets-Sheet 5

INVENTORS
ROBERT H. PHINNEY
GEORGE DUBON
BY
ATTORNEY

Fig. 9.

INVENTORS
ROBERT H. PHINNEY
GEORGE DUBON
BY Fritz Ziegler
ATTORNEY

Feb. 28, 1939.  R. H. PHINNEY ET AL  2,149,099
DISPENSING APPARATUS
Filed April 7, 1937  7 Sheets-Sheet 7

INVENTORS
ROBERT H. PHINNEY
GEORGE DUBON
BY Fritz Ziegler
ATTORNEY

Patented Feb. 28, 1939

2,149,099

UNITED STATES PATENT OFFICE 2,149,099

DISPENSING APPARATUS

Robert H. Phinney, New York, and George Du Bon, Rosedale, N. Y., assignors, by mesne assignments, to Sani-Self Server Corporation, New York, N. Y., a corporation of New York Application April 7, 1937, Serial No. 135,400

14 Claims. (Cl. 312—67)

This invention relates to improvements in dispensing apparatus and has particular reference to a mechanism for controlling the discharge from a casing of articles, such as various types of eating utensils.

In a co-pending application filed July 6, 1936, Ser. No. 89,000, there is disclosed a similar type of dispensing apparatus in which articles are individually fed to a carriage and moved thereby to a discharge position in which the article may be withdrawn from the casing of the apparatus. In said application, the feeding of the article to the carriage and its movement to the discharge position, is initiated by the manual operation of a plunger which, in its movement in one direction, controls the feeding of an article onto the carriage and which, upon its return movement, effects the adjustment of said carriage and the article thereon to said discharge position.

In accordance with the present invention, it is proposed to eliminate the use of a plunger for controlling the operation of feeding and discharging an article, and to depend solely upon the withdrawal of an article from its discharged position to accomplish, in a novel manner, the feeding of another article to a similar position.

The inventive idea involved is capable of receiving a variety of mechanical expressions some of which, for purposes of illustration, are shown in the accompanying drawings wherein:

Figure 1 is a perspective view of the apparatus illustrated in accordance with the present invention.

Figure 2 is a similar view of one of a plurality of hoppers which are removably mounted in the casing of the apparatus and adapted to contain a supply of articles such as knives, forks, spoons and the like.

Figure 5:
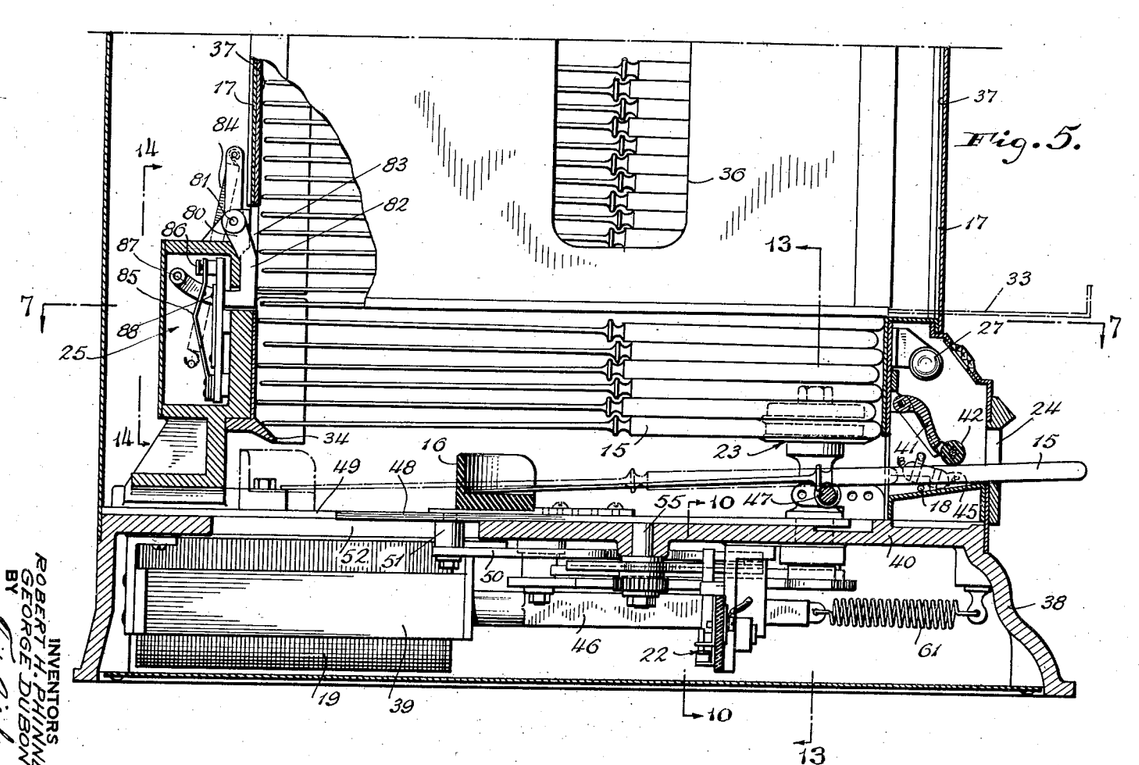
Figure 5 is a vertical longitudinal section taken through one of the hoppers and showing an article, such as a knife, in its discharged position wherein it is ready to be withdrawn from the casing.
Figure 11:
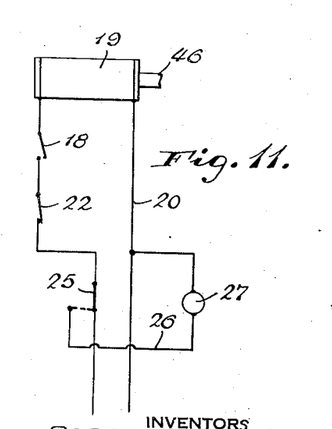
Figure 11 is a diagrammatic view of the circuit for said electromagnetic device.
Figure 12:
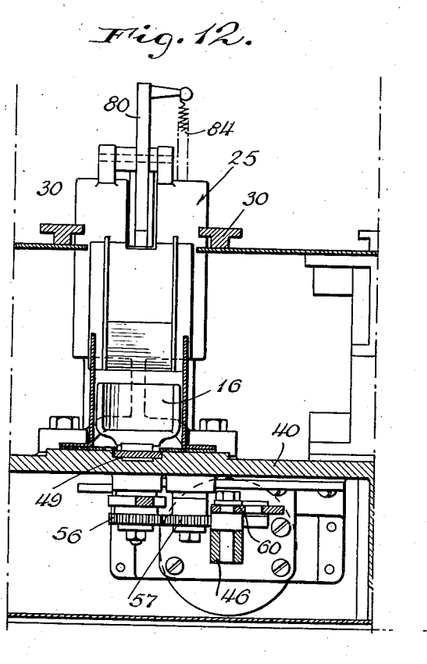
Figure 12 is a section taken substantially on the line 12—12 of Figure 9.

The invention, in its preferred form, may be generally understood by a brief reference to Figures 5 and 11 of the drawings. In Figure 5, the mechanism is shown in normal position in which an article 15, such as a knife, has been fed, by a previous operation, onto a reciprocatory carriage 16, and propelled to a partially ejected or discharged position relative to the casing 17 of the apparatus, in which position the projecting end of the article may be readily grasped by a person desiring the same and withdrawn from the carriage and casing. This action of withdrawal initiates the operation of the mechanism by first causing the closure of a normally inoperative switching mechanism generally indicated by the numeral 18.

The switch of said mechanism is included in the circuit (Fig. 11) of an electromagnetic device such as the solenoid 19 individual to each of the units from which articles are being discharged. When the switch of the mechanism is closed the circuit for the solenoid 19 is established through the line conductor 20, the winding of the solenoid, the conductor 21, the switch 18, a normally closed reversing switch mechanism, generally indicated by the numeral 22, and from thence to the source of the current. The energization of the solenoid 19 moves its core from the position shown in Figures 5 and 8 to the position shown in Figure 9 and this movement, through a mechanism to be described hereinafter in detail, moves the carriage 16 rearwardly to the dotted line position of Figure 5 so as to be prepared to receive the lowermost article 15 contained in the stack located directly above the carriage. During the rearward movement of the carriage, the solenoid also controls the release of said lowermost article from the stack and the feeding thereof onto said carriage through the medium of a mechanism generally indicated in Figure 5 by the numeral 23. This mechanism, later to be described in detail, releases the lowermost article from the stack and at the same time engages the next lowermost article to prevent its release so that the articles will successively and individually feed from the stack. When the carriage has reached its rearmost position and the lowermost article 15 has been released, the mechanism controlled by the solenoid which operates to move the carriage to its receiving position also actuates the switching mechanism 22 to open the switch thereof and thereby de-energizes the solenoid so that the core thereof may be returned to its normal position. In so doing, the carriage 16 is moved forwardly by reversal of the operation of its controlling mechanism, and carries the released article therewith so as to partially eject the same through the outlet 24 in the casing, as shown in Figure 5. When the supply of articles 15 in the stack has been reduced to a predetermined minimum, means are provided to prevent the energization of the solenoid 19 upon removal of the article 15 which has been discharged into the outlet 24 so that the withdrawal of said article will not result in another reciprocation of the carriage 16 and operation of the feeding mechanism 23. This means included a third switching mechanism generally indicated by the numeral 25, mounted upon the rear of the casing 17 and positioned so that it will operate when the height of the stack of articles has been reduced to a predetermined point. The switch of this mechanism is included in the circuit of the solenoid 19, as shown in Figure 11, and is normally closed so that said circuit will be maintained at each operation of the switching mechanism 18, except when the number of articles 15 in the stack has been reduced to the minimum. When this occurs, the switch of the mechanism 25 will be actuated to open the circuit for the solenoid 19 so that the latter will not be energized when the switch 18 closes upon withdrawal of the last article 15 delivered to the outlet 24. When the switch 25 is thus actuated to open the solenoid circuit it is moved to the dotted line position of Figure 11 to close a circuit through the conductor 26 to the lamp 27 located in the front of the casing 17 adjacent the switching mechanism 18. This lamp is thereupon illuminated and acts as a visual signal so that an attendant may replenish the supply of articles to be dispensed.

The construction herein involved will now be described in detail.

The casing 17 is shown as having a compartment adapted to be closed by the swinging doors 28 and in which a plurality of hoppers 29 are supported between pairs of tracks 30 having abutments 31 (Fig. 3) at the rear ends thereof, which act to limit the inward sliding movement of the hoppers when they are mounted in the compartment. Each hopper has flanges 32 at the bottom engageable with said tracks 30 to guide the hopper in its movements into and out of the casing. A removable bottom 33 is provided for each hopper so that after the latter has been placed in the casing, the bottom may be removed to permit the articles stacked therein to drop into the position shown in Figure 5 wherein the lowermost article will be supported by the feeding mechanism 23 and by a forwardly inclined deflector 34 located at the rear of the casing, thus positioning said article preparatory to feeding it onto the carriage 16. Guides 35 are provided on the exterior surface of one side of the hopper to receive the bottom 33 when it is not in use and the other side of the hopper is open as at 36 to facilitate the stacking of a new supply of articles therein. If desired, opposed article guides 37 may be positioned along the interior surfaces of the end walls of the hopper.

Figures 1, 2:
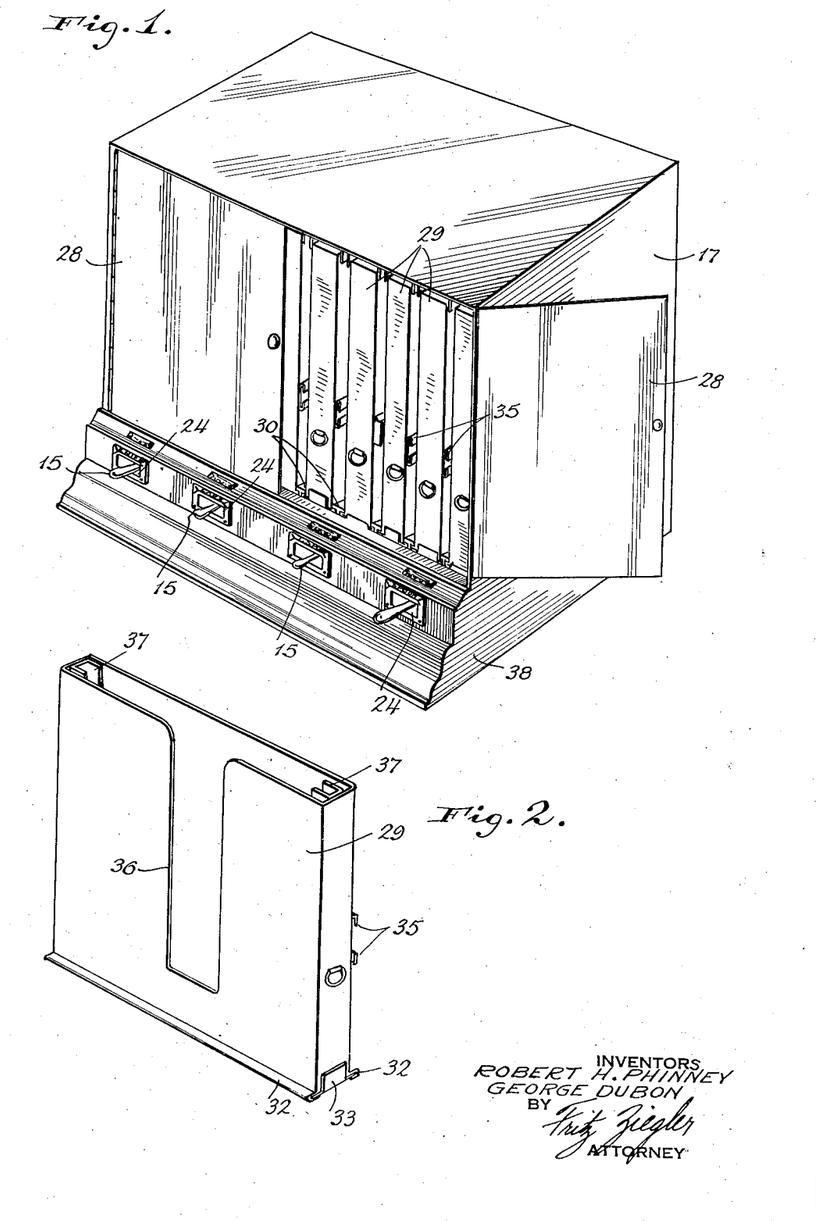
Figure 3:
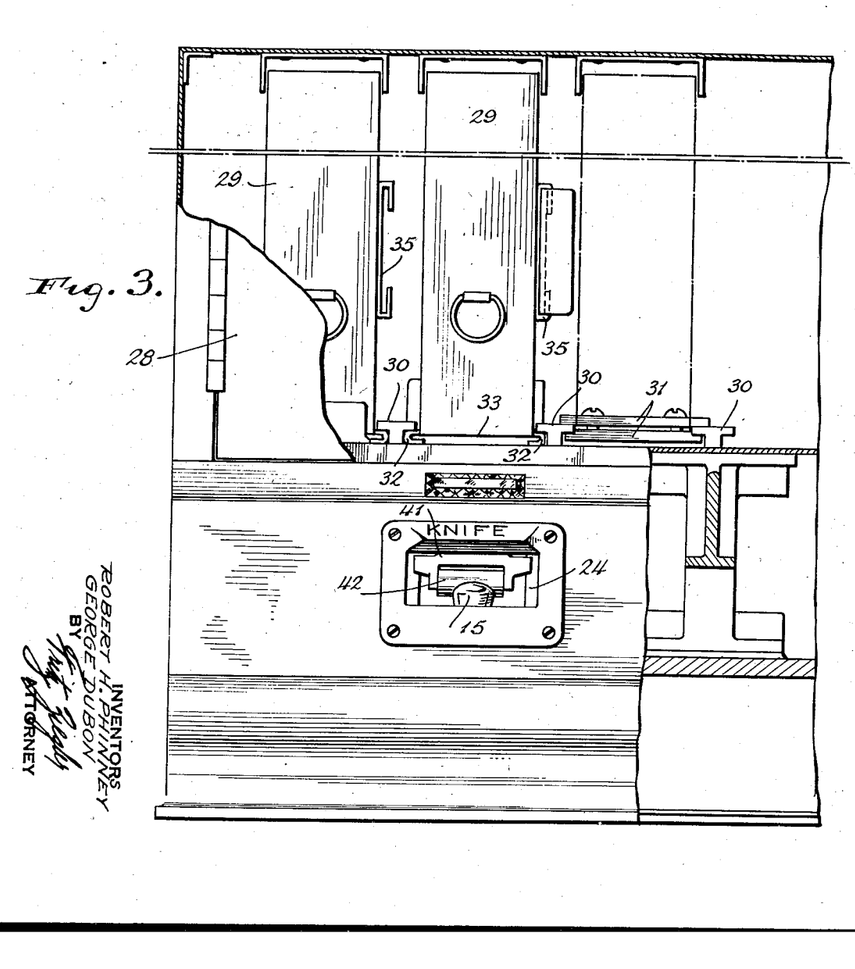
Figure 3 is a fragmentary front elevation, partly in section, showing three hoppers in position within the casing, the central hopper being in position to discharge its articles to the outlet located directly below the hopper in the front of the casing, while the other two hoppers are provided as auxiliary containers which may be substituted for the central hopper when the supply therein approaches exhaustion.

As best shown in Figures 1 and 3, outlets 24 are arranged in the base 38 of the casing directly below each alternate hopper 29 from which articles, such as knives, spoons, forks, and the like, are being dispensed. The hoppers on either side of the one actually in use are merely auxiliary hoppers which may be withdrawn to replace the central hopper when the utensils in the latter have reached the minimum at which the mechanism will no longer operate to eject an article to its position of withdrawal. There is one complete operating mechanism associated with each of the outlets 24 and hence a description of one of the units will suffice for an understanding of the construction and operation of the invention.

Figure 4:
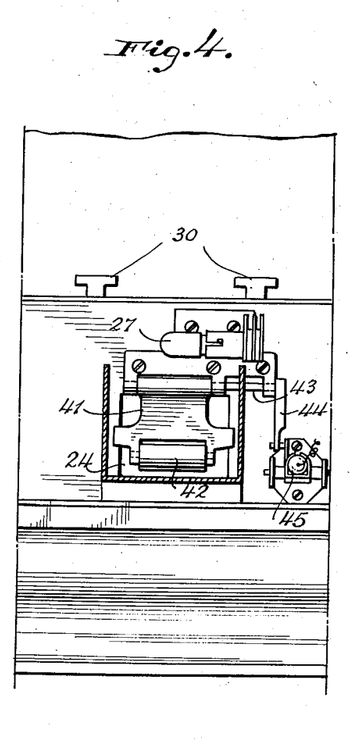
Figure 4 is a fragmentary elevation, with the front of the casing removed, showing one of the switching mechanisms associated with each of the article outlets in the front of the casing, said mechanism operating, when an article is withdrawn from an outlet, to initiate the discharge of another article to a withdrawing position, as indicated in Figure 1.

As previously stated, the switching mechanism 18 located in the front of the casing adjacent to outlet 24 is utilized to initiate the operation of the reciprocating carriage 16 and the article feeding mechanism 23, by energizing the solenoid 19 mounted in a bracket 39 supported below the bottom 40 of the casing. To accomplish this purpose, the mechanism 18 comprises a pivoted arm 41 having a roller 42 at its lower end which rests upon the handle of the article 15 which is in its partly ejected position with respect to the outlet 24, said article maintaining the arm 41 in a raised position until the former is completely withdrawn from the casing. When this occurs, the arm 41 will swing downwardly by gravity and in so doing will turn a rock shaft 43 (Fig. 4) to actuate a connection 44 to a mercury switch generally indicated by the numeral 45. This switch, which is in the circuit of the solenoid 19, is of a conventional construction and is tilted in its normal position so as to open the said circuit. However, when the arm 41 swings downwardly the connection to said switch will swing the latter into a horizontal position in which the terminals thereof will be electrically joined so as to close said circuit and thereby energize the solenoid. Upon energization of the latter, its core 46 will be moved rearwardly from the position of Figure 8 to that of Figure 9 and, in so doing, the reciprocation of the carriage 16 and operation of the feeding mechanism 23 will be simultaneously started.

The timing of the operation is such that the complete release of the lowermost article 15 by the mechanism 23 does not occur until the carriage 16 has reached the limit of its rearward movement as indicated in dotted lines in Figure 5, whereupon the rear end of the utensil will be guided onto said carriage by the deflector 34 and the handle of the article will fall upon and be supported by the roller 47 situated directly behind the outlet 24.

The construction of the carriage and of the mechanism which moves it to the rear or the article receiving position will first be described. The body of the carriage is provided with a base 48 slidably mounted, on the upper surface of the bottom 40, in a trackway 49 provided therefor. The operating mechanism by means of which the carriage is reciprocated comprises a link member 50 joined at its rear end to a pivot 51, which depends from the base 48 of the carriage through an elongated slot 52 in the base 40, and at its forward end said link 50 is pivotally connected at 53 to an oscillatory control element 54 suspended below the bottom 40 by a pivot 55 so that said element will swing from the position of Figure 8 to that of Figure 9 when the solenoid is energized, said swinging movement transmitting the rearward movement to the carriage 16 through the link connection 50. To impart said movement to the oscillatory control member 54, the latter has associated therewith a gear 56 which meshes with a segmental rack 57 pivotally mounted for oscillation at 58. An extension 59 of the rack 57 has pivoted thereto one end of a link 60 the other end of which is similarly joined to the core 46 of the solenoid so that when the latter moves rearwardly the segment 57 will be swung in a clockwise direction, as viewed in Figure 8, to rotate the gear 56 and thus impart the proper movement to the element 54 to slide the carriage 16 rearwardly through the medium of the link 50. Upon reaching the rear position of the carriage, the control element 54 is utilized, in a manner which will hereinafter be described in detail, to operate the switching mechanism generally indicated by the numeral 22 to open the circuit for the solenoid 19 and thus cause its restoration to normal position under the influence of the coil spring 61 connected to the core 46 and the base 38 of the casing. Before proceeding to the description of the said switching mechanism 22, the operation of the feeding mechanism 23, which occurs during the rearward movement of the carriage 16 will be described.

Figure 13:
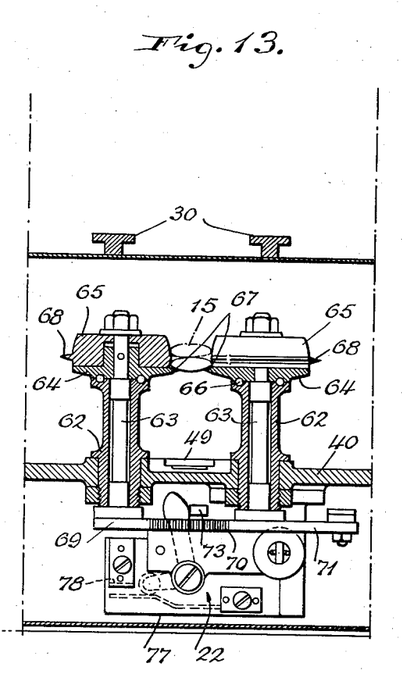
Figure 13 is a section on the line 13—13 of Figure 5.

Said feeding mechanism comprises, generally, a pair of articles supporting instrumentalities arranged on opposite sides of the trackway 49 in which the base of the carriage 16 is slidable, and adjacent the front of the casing where the same will cooperate to support the handles of the articles 15. As best illustrated in Figure 13, each of said instrumentalities is shown as comprising a vertically disposed sleeve 62 having its lower end secured in the bottom 40 and forming a bearing for the oscillatory shaft 63. The upper end of said shaft has fixed thereon the superimposed disk-like article supporting members 64 and 65, with the lower member 64 having an anti-friction bearing 66 on the upper end of the stationary sleeve 62. In the normal position of the parts, as shown in Figure 13, each of the lower members 64 is so positioned that a projecting flange 67 is engaged under the lowermost article 15 to support the entire stack of articles. Said flange extends only partially around the member 64 so that when the latter is rotated in one direction said flange will disengage the lowermost article in the stack and permit it to drop to the position of Figure 5. Before said flange is disengaged from the article 15 a flange 68 extending partially about the upper member 65 will, as the latter is rotated, engage between the lowermost and the next superimposed article so that when the lowermost article is released the one above, which then becomes the lowermost article, will be prevented from dropping onto the carriage, thus enabling said articles to be individually fed from the stack. Upon the return movement of the members 64, 65 to their normal positions, the flanges 67 will first be brought into supporting position after which the flanges 68 will disengage from the then lowermost article which will now drop onto the supporting flanges 67 to wait the next feeding operation of the mechanism.

The oscillation of the two feeding devices just described is accomplished through the medium of the intermeshing segmental gears 69 and 70 (Figs. 8 and 9) pivotally supported below the bottom 40 and connected to the respective shafts 63. The gear 70 is provided with an arm 71 to which one end of a link 72 is connected, the other end of said link being pivoted to the extension 59 so that said gears 69, 70 will be operated when the gear 57 is actuated by the link 60 connected to the extension 59 thereof. Thus, when the solenoid 19 is energized, a rearward pull is exerted upon the link 72 to rotate said gears 69, 70 from the position of Figure 8 to that of Figure 9 thus imparting a similar movement to the two feeding devices which then act to release the lowermost article 15 in the stack; and, upon the return movement of the core 46 of the solenoid to its normal position under the influence of the spring 61 said gearing will be rotated in the opposite direction to restore said feeding devices.

Figure 9:
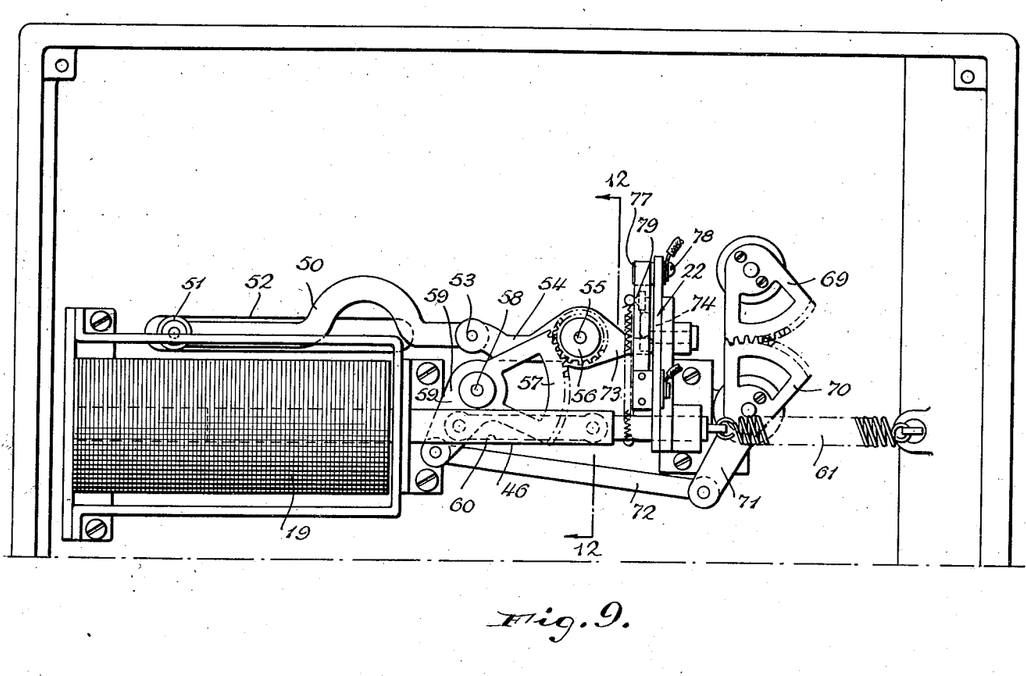
Figure 9 is a view similar to Figure 8, illustrating the parts in the positions they assume at an intermediate stage of the operation.

Reverting now to the situation in which the carriage 16 has been moved to its receiving position and the feeding mechanism 23 has been operated to release an article from the stack, as the control element 54 of the operating mechanism reaches the position of Figure 9 an extension 73 of said element becomes effective to operate the switching mechanism 22 so as to open the circuit of the solenoid 19 thereby deenergizing the same preparatory to the return movement of the entire mechanism to its normal position by means of the spring 61.

Figure 10:
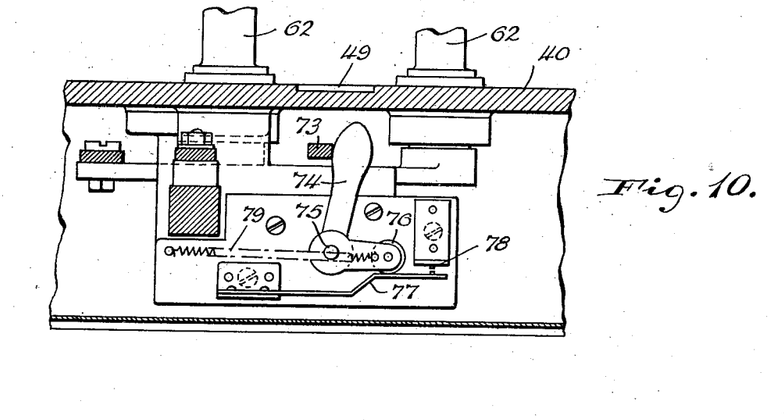
Figure 10 is a fragmentary sectional view taken substantially on the line 10—10 of Figure 5 and illustrating the switch which controls the de-energization of an electromagnetic device utilized to effect the operation of the mechanism, said switch being in its operated position.

By reference to Figures 10 and 13, it will be seen that the mechanism 22 comprises a lever 74 pivoted at 75 and having one end disposed in the path of the extension 73 as the same is operated to the position of Figure 9. Contact of the extension 73 with said lever rocks the same to assume the position in Figure 10 in which the opposite end of the lever 74, carrying the roller 76, forces the spring contact 77 out of engagement with the contact 78, thereby breaking the normally closed circuit for the solenoid 19 to effect a reversal of the operating mechanism to normal position.

Figure 6:
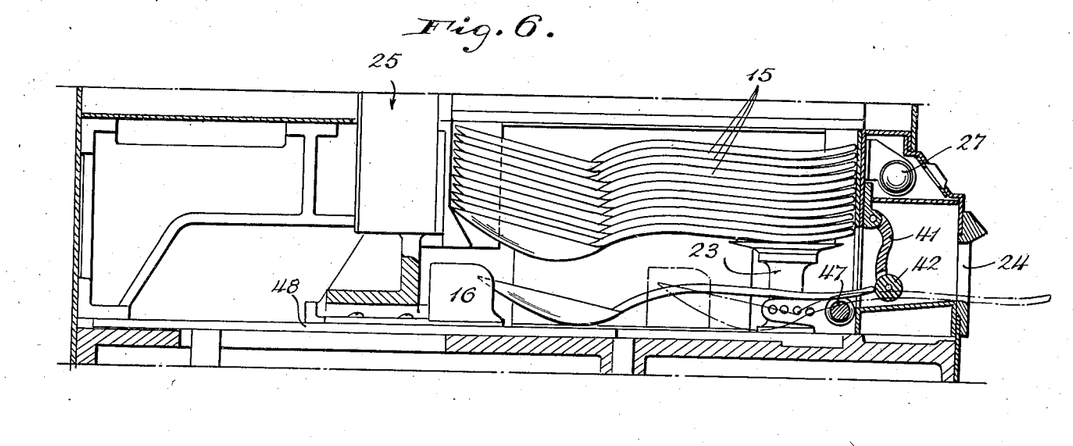
Figure 6 is a fragmentary view similar to Figure 5, illustrating the manner in which other articles, such as spoons, may be successively discharged from the casing.
Figure 7:
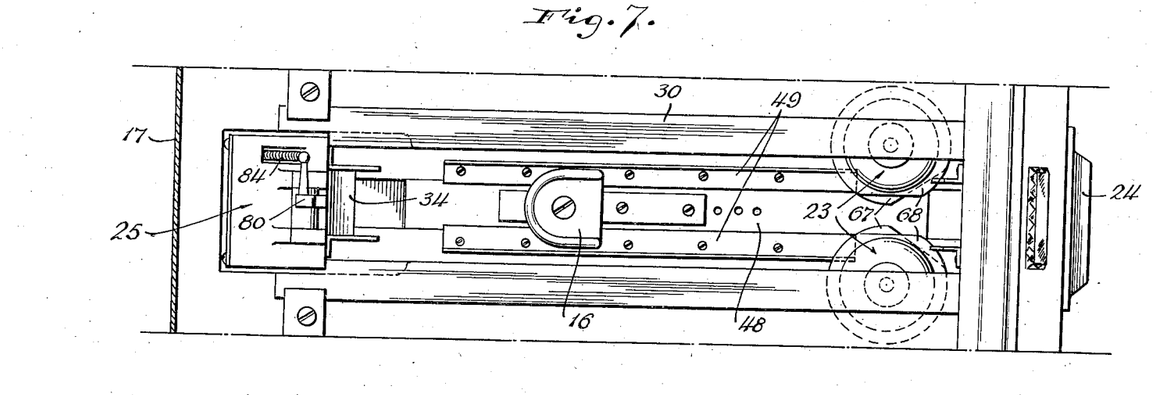
Figure 7 is a horizontal sectional view taken substantially on the line 7—7 of Figure 5.
Figure 8:
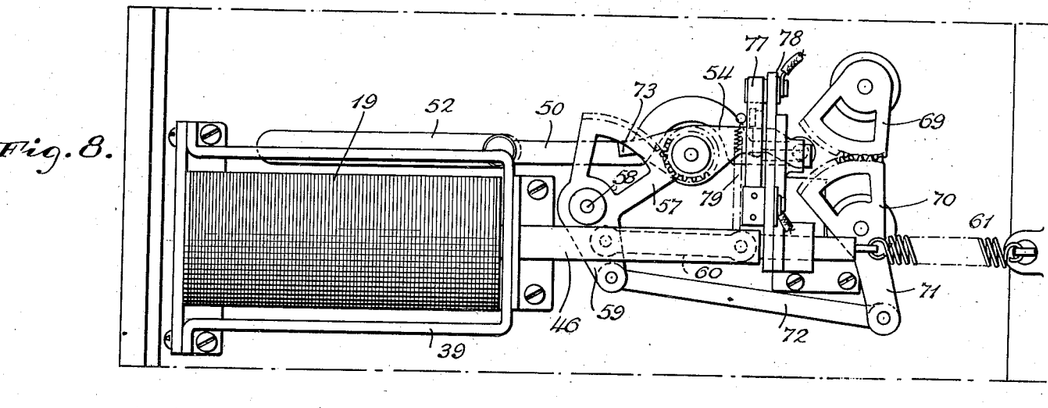
Figure 8 is a bottom plan view of the operating mechanism shown in the lower portion of Figure 5, the parts being in their normal positions.

When the control element 54 has been restored to the position of Figure 8 the same will have engaged the upper end of the lever 74, swinging the same to the left, as viewed in Figure 10, whereupon the coil spring 79 will act to restore the lever to its normal position, permitting the contacts 77, 78 to again engage and thus close the circuit for the solenoid at this point. As the carriage 16 is moved forwardly under the influence of the spring 61, following the de-energization of the solenoid 19, the article 15 which has then been deposited upon the carriage is pushed forward so that the handle of the article will be partially projected through the outlet 24. As said article approaches this position and before the switch 22 has been closed the handle on said article will contact the arm 41 and swing the latter upwardly so as to restore the mercury switch 45 to its normal position and thus open the circuit of the solenoid at this point. The cycle of operation of moving the carriage 16 to its article receiving position, actuating the feeding mechanism to deposit an article upon said carriage, and then restoring the carriage to its normal or discharging position has now been completed, and this same cycle of operation is applicable, as will be seen in Figure 6, to other articles such as spoons, or the like.

Figure 14:
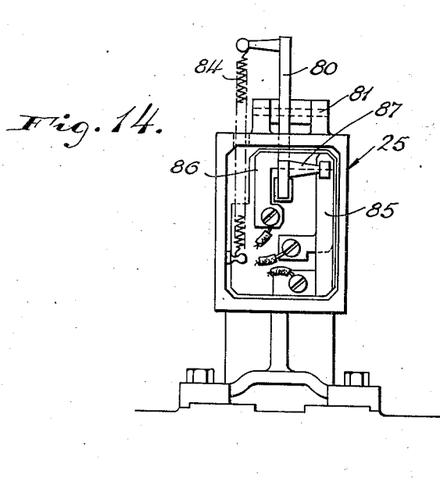
Figure 14 is a section on the line 14—14 of Figure 5, illustrating in elevation a switching mechanism which is operable, when the number of articles in the hopper had been reduced to a predetermined minimum, to prevent the energization of said electromagnetic device and to operate a visual signal which indicates that the supply of articles in the hopper associated with said signal is nearing exhaustion.

The switching mechanism 25 which is operable, when the supply of articles in the hopper has reached a predetermined minimum, to prevent operation of the carriage and feeding mechanism and to operate the signal 27, will now be described by reference to Figures 5 and 14. This mechanism is located at the rear of the casing 17 and in cooperative position with the rear ends of the stacked articles in the hopper. Said mechanism comprises a lever 80 pivoted on the casing at 81 and having a lower portion 82 disposed in an opening 83 in the back of the casing 17 so as to be contacted by the adjacent ends of the articles 15 in the stack. Said portion 82 is held in contact with said articles by an inward pressure exerted upon said portion through the medium of a coil spring 84 connecting the upper end of the lever 80 to a stationary part of the casing. The switch of the mechanism includes a movable contact 85 normally engaged with a terminal 86 included in the circuit of the solenoid 19. However, when the topmost article 15 in the hopper has moved downwardly below the portion 82 of the lever 80, after successive feedings of the articles onto the carriage 16, the spring 84 then becomes effective to swing the portion 82 inwardly since there is no longer an article with which said portion will contact. As this inward movement is accomplished the extremity of a contact arm 87 projecting rearwardly from the lower end of the portion 82 engages the movable contact 85 to thus break the circuit of the solenoid at the terminal 86. Immediately following this, further inward movement of the contact 85 will cause it to be engaged with a terminal 88 to close the circuit through the conductor 26 to the lamp 28 which is thereupon illuminated and acts as a signal to an attendant who may then withdraw the hopper 29 from which articles were being fed and replace the same with one of the auxiliary hoppers which had been previously filled with the articles to be dispensed. As this latter hopper is inserted into the casing the rear ends of the articles which are disposed on a horizontal level with the opening 83 in the back of the casing will contact the portion 82 and swing it rearwardly to the normal position of Figure 5, against the tension of spring 84. Pressure of the arm 87 against the spring contact 85 being then released, the latter will restore so as to disengage the terminal 88 and re-engage the terminal 86 thereby opening the signaling circuit and again closing the solenoid circuit.

What is claimed is:

1. In combination, a hopper from which articles are to be dispensed, a movable carriage onto which said articles are fed individually, means to so feed said articles, means responsive to the removal of an article from said carriage to control said feeding means and to move said carriage from one position to another in which it receives a second article from said hopper after the removal of the first article, and means rendered effective during the movement of said carriage to its second named position to return the same to its first named position after receiving an article thereon.

2. In combination, a hopper from which articles are to be dispensed, a carriage onto which said articles are fed individually and which has article discharging and receiving positions, means to individually feed articles from said hopper to said carriage when the latter is in receiving position, electromagnetically responsive means operable, upon removal of an article from said carriage when it is in discharging position, to move said carriage to its receiving position and to control said feeding means so that another article will be deposited upon said carriage, and means to restore said carriage to its dicharging position after having received said other article.

3. In combination, a hopper from which articles are to be dispensed, a movable carriage onto which said articles are fed individually, means to so feed said articles, an electromagnetic device, a switch for said device including a member engageable with an article supported on said carriage and operable by withdrawal of said article to close said switch to thereby energize said device, means thereupon operated by said device to move said carriage to an article receiving position and to actuate said feeding means to deposit another article on said carriage, a second switch for said electromagnetic device, means operable upon actuation of said feeding means to control said second switch so as to de-energize said device, and means to then move said carriage to a position in which said other article may be removed therefrom.

4. In combination, a hopper from which articles are to be dispensed, a movable carriage onto which said articles are fed individually and which has a normal discharging position, means to feed said articles onto said carriage, an electromagnetic device, a switch therefor including a pivoted contact member resting upon the article in said carriage when the latter is in normal position and movable about its pivot, when said article is removed, to actuate said switch to thereby energize said device, means responsive to the energization of said device to move said carriage to an article receiving position and to operate said feeding means, a second switch for said electromagnetic device, means operable upon actuation of said feeding means to control said second switch to de-energize said device, and means to then move said carriage to its normal position.

5. In combination, a hopper from which articles are to be dispensed, a carriage having an article discharging and receiving positions, means to individually feed articles from said hopper onto said carriage, an electromagnetic device including a movable element, a gear operated by said movable element when said device is energized, a control member actuated by said gear, a connection between said control member and said carriage for moving the latter from its discharging position to its receiving position, means connected to said gear and actuated thereby to operate said feeding means, means actuated by the removal of an article from said carriage to energize said electromagnetic device, and other means actuated by said control member to de-energize said device after said feeding means has been operated.

6. In combination, a hopper from which articles are to be dispensed, a carriage having article discharging and receiving positions, means to individually feed articles from said hopper onto said carriage, an electromagnetic device including a movable element, a gear operated by said movable element when said device is energized, a control member actuated by said gear, a connection between said control member and said carriage for moving the latter from its discharging position to its receiving position, means connected to said gear and actuated thereby to operate said feeding means, a normally open switch for said electromagnetic device closed, by the removal of an article from said carriage when the latter is in discharging position, to energize said device, and a normally closed switch opened by said control member, after said carriage has reached its receiving position, to de-energize said device.

7. In combination, a hopper from which articles are to be dispensed, a carriage having article discharging and receiving positions, means to individually feed articles from said hopper onto said carriage, an electromagnetic device including a movable element, a gear operated by said movable element when said device is energized, an oscillating control member actuated by said gear, a connection between said control member and said carriage to move the latter to said positions when said gear is operated, oscillatory gears for operating said feeding means, a connection between the first named gear and said oscillatory gears to operate the latter, normally open switch for said electromagnetic device closed to energize the same when an article is removed from said carriage, and a normally closed switch opened by said control member to de-energize said device after said carriage has reached its receiving position.

8. In combination, a hopper from which articles are to be dispensed, a movable carriage onto which said articles are fed individually, means to so feed said articles, an electromagnetic device, means responsive to the withdrawal of an article from said carriage to energize said device, an operating mechanism to move said carriage to a position for receiving another article when said device is energized, a switch for de-energizing said device, and an element common to said switch and said operating mechanism for controlling the operation thereof after said device has been energized.

9. In combination, a hopper from which articles are to be dispensed, a movable carriage onto which said articles are fed individually, means to so feed said articles, an electromagnetic device, a switch responsive to the withdrawal of an article from said carriage to energize said device, a second switch to de-energize said device, operating mechanism for said carriage, means including a control element common to said operating mechanism and said second switch to successively actuate the same when said device is energized, and means to reverse the operation of said operating mechanism after said second switch has de-energized said electromagnetic device.

10. In combination, a hopper from which articles are to be dispensed, a movable carriage onto which said articles are fed individually, means to so feed said articles, means responsive to the removal of an article from said carriage to control said feeding means and to move said carriage from one position to another in which it receives a second article from said hopper after the removal of the first article, means rendered effective by the movement of the carriage to its receiving position to thereafter return the same to the first named position, and means operable to render the second named means ineffective when the number of articles in said hopper has been reduced to a predetermined minimum.

11. In combination, a hopper from which articles are to be dispensed, a movable carriage onto which said articles are fed individually, means to so feed said articles, an electromagnetic device, means responsive to the withdrawal of an article from said carriage to energize said device, means actuated upon such energization to move said carriage to a position for receiving another article, actuate said feeding means, and thereafter restore said carriage to a position wherein said other article may be withdrwn therefrom, and a switch for said device operated, by the reduction of the number of articles in said hopper to a predetermined minimum, to prevent energization of said electromagnetic device.

12. In combination, a hopper from which articles are to be dispensed, a movable carriage onto which said articles are fed individually, means to so feed said articles, an electromagnetic device, a switch for said device including a member engageable with an article supported on said carriage and operable by withdrawal of said article to close said switch to thereby energize said device, means thereupon operated by said device to move said carriage from one position to an article-receiving position and to actuate said feeding means to deposit another article on said carriage, a second switch operated by the movement of said carriage to its receiving position for deenergizing said device after deposit of said other article, means to thereupon restore said carriage to its first named position, a third switch operated, when the number of articles in said hopper has been reduced to a predetermined minimum, to render the first named switch ineffective, and a signal controlled by the operation of said third switch.

13. In combination, a hopper from which articles are to be dispensed, a carriage having article discharging and receiving positions, means to individually feed articles from said hopper onto said carriage, an electromagnetic device including a movable element, a gear operated by said movable element when said device is energized, a control member actuated by said gear, a connection between said control member and said carriage for moving the latter from its discharging position to its receiving position, means connected to said gear and actuated thereby to operate said feeding means, a normally open switch for said electromagnetic device closed, by the removal of an article from said carriage when the latter is in discharging position, to energize said device, a normally closed switch opened by said control member, after said carriage has reached its receiving position, to de-energize said device, and a third switch operated by the reduction of the number of articles in said hopper to a predetermined minimum, to prevent energization of said electromagnetic device in response to the removal of an article from said carriage.

14. In combination, a hopper from which articles are to be dispensed, a carriage having article discharging and receiving positions, means to individually feed articles from said hopper onto said carriage, an electromagnetic device including a movable element, a gear operated by said movable element when said device is energized, a control member actuated by said gear, a connection between said control member and said carriage for moving the latter from its discharging position to its receiving position, means connected to said gear and actuated thereby to operate said feeding means, means actuated by the removal of an article from said carriage to energize said electro-magnetic device, means operated by the movement of said carriage to its receiving position to deenergize said device, means to thereupon return said carriage to its discharging position, and means to prevent energization of said device when the number of articles in said hopper has been reduced to a predetermined minimum.

ROBERT H. PHINNEY.
GEORGE DU BON.